(12) United States Patent
Kubala et al.

(10) Patent No.: US 6,209,106 B1
(45) Date of Patent: Mar. 27, 2001

(54) METHOD AND APPARATUS FOR SYNCHRONIZING SELECTED LOGICAL PARTITIONS OF A PARTITIONED INFORMATION HANDLING SYSTEM TO AN EXTERNAL TIME REFERENCE

(75) Inventors: Jeffrey P. Kubala, Poughquag; Ira G. Siegel, New Paltz; Kenneth M. Trowell, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,539

(22) Filed: Sep. 30, 1998

(51) Int. Cl.$^7$ ............................................. G06F 1/04
(52) U.S. Cl. ........................ 713/500; 713/400; 709/400
(58) Field of Search ................................. 713/400, 401, 713/500, 502, 503, 600, 601; 712/1; 709/248, 400

(56) References Cited

U.S. PATENT DOCUMENTS

| | | | |
|---|---|---|---|
| 4,564,903 | | 1/1986 | Guyette et al. ...................... 364/300 |
| 4,843,541 | | 6/1989 | Bean et al. ........................... 364/200 |
| 4,914,653 | * | 4/1990 | Bishop et al. ....................... 370/85.6 |
| 5,530,846 | * | 6/1996 | Strong .................................. 713/401 |
| 5,564,040 | | 10/1996 | Kubala ............................. 395/497.04 |
| 5,600,632 | * | 2/1997 | Schulman ............................. 370/252 |
| 5,636,373 | | 6/1997 | Glendening et al. ................. 395/551 |
| 5,802,354 | | 9/1998 | Kubala et al. ....................... 395/551 |
| 5,878,205 | * | 3/1999 | Greenstein et al. ..................... 714/11 |
| 5,923,890 | * | 7/1999 | Kubala et al. .......................... 712/1 |
| 5,925,107 | * | 7/1999 | Bartfai et al. ........................ 709/248 |
| 5,940,608 | * | 8/1999 | Manning ............................... 713/503 |
| 6,003,091 | * | 12/1999 | Bartfai et al. ........................ 709/248 |

OTHER PUBLICATIONS

IBM Manual, GA22–7236–03, "S/390 Processor Resource/Systems Manager Planning Guide".
IBM Manual, SA22–7201–02, "Enterprise Systems Architecture/390 Principles of Operation".

\* cited by examiner

Primary Examiner—Thomas Lee
Assistant Examiner—Ri Jue Mai
(74) Attorney, Agent, or Firm—William A. Kinnaman, Jr.

(57) ABSTRACT

A method and apparatus for specifying offsets from an external time reference (ETR) for selected logical partitions of a partitioned information handling system. Each logical partition has a logical time-of-day (TOD) clock which may be set independently of the host system clock by specifying an epoch offset from the host clock. A system operator is presented with a display panel in which the operator may specify the magnitude and sign of an ETR offset for each logical partition selected to have an ETR offset. Each logical partition, upon being activated, issues a Store Clock (STCK) instruction to read its own logical TOD clock as well as a Store ETR (STETR) instruction to read the ETR. If the logical partition has a specified ETR offset, the logical partition manager simulates the STETR instruction by adding or subtracting the ETR offset to the real ETR time and returning the modified value to the partition; otherwise, the logical partition manager returns the real ETR time to the partition. If the read ETR time (as returned by the STETR instruction) differs from the read logical clock time, the logical partition issues a Set Clock (SCK) instruction to reset the logical partition clock to the ETR time. The logical partition manager simulates this latter instruction by computing the difference between the two times and storing the difference in an epoch offset field for the partition. The invention permits sets of logical partitions to be synchronized to different clock values, either for test purposes or operation in different time zones.

3 Claims, 8 Drawing Sheets

- PROFILE NAME: LP1
- DESCRIPTION: THIS IS THE DEFAULT LPAR IMAGE PROFILE
- PARTITION IDENTIFIER: 1
- MODE:
  - ESA/390
  - ESA/390 TPF
  - COUPLING FACILITY

☐ ENABLE INTEGRATED COUPLING MIGRATION FACILITY (ICMF)

— CLOCK TYPE ASSIGNMENT —
- ○ STANDARD TIME OF DAY (604)
- ● LOGICAL PARTITION SYSPLEX TIMER OFFSET (606)
- ○ PARTICIPATE IN THE SYSPLEX TEST DATESOURCE GROUP (608)

602 ASSIGNED FOR ACTIVATION

[SAVE] [COPY NOTEBOOK] [PASTE NOTEBOOK] [ASSIGN PROFILE] [CANCEL] [HELP]

METHOD AND APPARATUS FOR SYNCHRONIZING SELECTED LOGICAL PARTITIONS OF A PARTITIONED INFORMATION HANDLING SYSTEM TO AN EXTERNAL TIME REFERENCE

BACKGROUND OF THE INVENTION

1. Field of the Invention

This invention relates to a method and apparatus for synchronizing selected logical partitions of a partitioned information handling system to an external time reference and, more particularly, to such a method and apparatus that provides a way to specify a fixed time offset from the external time reference for a group of logical partitions that make up a sysplex running on multiple central processor complexes.

2. Description of the Related Art

Many IBM S/390® and compatible hardware machines operate in what is known as logically partitioned (LPAR) mode. Logically partitioned computer systems are well known in the art and are described in U.S. Pat. No. 4,564,903 (Guyette et al.), U.S. Pat. No. 4,843,541 (Bean et al.), and U.S. Pat. No. 5,564,040 (Kubala), incorporated herein by reference. Commercial embodiments of logically partitioned systems include IBM S/390 processors with the Processor Resource/Systems Manager™ (PR/SM™) feature and are described, for example, in the IBM publication *Processor Resource/Systems Manager Planning Guide*, GA22-7236-03, June 1998, incorporated herein by reference.

Logical partitioning allows the establishment of a plurality of system images within a single physical central processor complex (CPC). Each system image is capable of operating as if it were a separate computer system. That is, each logical partition can be independently reset, initially loaded with an operating system that may be different for each logical partition, and operate with different software programs using different input/output (I/O) devices. Logical partitioning is in common use today because it provides its users with flexibility to change the number of logical partitions in use and the amount of physical system resources assigned to each partition, in some cases while the entire central processor complex continues to operate.

Currently, in a partitioned S/390 central processor complex, each logical partition has its own logical partition clock together with an epoch offset indicating the difference between the logical partition clock and a host clock. This is described in U.S. Pat. No. 5,636,373 (Glendening et al.), incorporated herein by reference. By suitable setting of its epoch offset, a particular partition may be synchronized to one clock value (e.g., a test clock value for year 2000 testing), while other partitions may be synchronized to another clock value (e.g., that of an external time reference).

While a single logical partition may thus be synchronized to a test clock value, previously an operator had to use an entire central processor complex to do year 2000 testing of a multi-member "sysplex" (i.e., containing multiple logical partitions). This was done in one of two ways in S/390 environments. For a central processor complex that did not have an external time reference (ETR) attached, the operator set the time-of-day (TOD) clock of an attached support element ahead, did a power-on reset into logically partitioned mode, and used the simulated ETR support of each logical partition operating system (e.g., the SIMETRID support of OS/390 and MVS/ESA). For a central processor complex that did have a real external time reference, the external time reference was set ahead. Neither of these alternatives, however, provided an environment where a production system could operate alongside a multi-member test sysplex that had a different time/date.

U.S. Pat. No. 5,802,354 (Kubala et al.), incorporated herein by reference, describes a method and apparatus for synchronizing selected logical partitions of a partitioned information handling system to a test datesource. As described in the patent, a system operator is presented with a display panel in which the operator may specify a set of test partitions making up a test sysplex, together with a starting test clock value, or datesource. The test clock value may be selected for year 2000 testing and may differ from the production clock value to which the non-test (production) partitions are synchronized.

Each partition designated as a test partition is synchronized to the test clock upon its next activation, while production partitions are synchronized to a production clock as in a conventional configuration. The first test partition to be newly activated is synchronized to the starting test clock value entered by the system operator. Each subsequently activated test partition, on the other hand, is synchronized to the current clock value of the previously activated test partition, which has meanwhile advanced from the starting value entered by the system operator. As a result, all of the test partitions are synchronized to a common test clock value, allowing them to interact as a true sysplex. In effect, the test partitions make up a virtual sysplex with a time and date other than that of the production sysplex.

While the system described in U.S. Pat. No. 5,802,354 represents an advance over the art, certain problems remain. Currently, in order to perform year 2000 testing on multiple CPCs, the hardware involved in the test (both the CPCs and the ETR(s)) has to be dedicated to the year 2000 test effort. One cannot not simultaneously use that hardware for current-date production sysplex work.

Also, multiple sysplexes cannot be run from the same set of CPCs and ETR(s) where the time returned from a Store Clock (STCK) instruction reflects different time zones in the different sysplexes.

SUMMARY OF THE INVENTION

In general, the present invention relates to a method and apparatus for synchronizing logical partitions of a logically partitioned machine to an external time reference (ETR) clock value. Each logical partition has a logical clock capable of being set to a specified logical clock value. In accordance with the invention, an ETR offset from the ETR clock value is specified for each of a set of selected logical partitions, and the logical clock of each of the selected logical partitions is set to a logical clock value offset from the ETR clock value by the ETR offset specified for that partition. Each logical clock may comprise a time-of-day (TOD) clock, and the ETR offsets may be specified by receiving input from a system operator.

Each selected logical partition is preferably set to its logical clock value upon being newly activated. More particularly, at activation time, each selected logical partition compares its logical clock value to the ETR clock value and resets its logical clock value to the ETR clock value if the logical clock value differs from the ETR clock value. To compare the two clock values, each partition issues a first read instruction (STCK) to the logical partition manager (i.e., to the physical machine) to read the logical clock value and issues a second read instruction (STETR) to the logical partition manager to read the ETR clock value.

The logical partition manager stores a host clock value and an epoch offset for each logical partition representing the difference between the logical clock value and the host clock value for that partition. The logical partition manager responds to the first read instruction (STCK) by arithmetically combining the host clock value with the epoch offset stored for the partition to generate the logical clock value. The logical partition manager responds to the second read instruction (STETR) by arithmetically combining the ETR clock value with the ETR offset specified for the partition to generate an offset ETR clock value that is returned to the partition.

A logical partition resets its logical clock value to the ETR clock value by issuing a set clock instruction (SCK) to the logical partition manager to set the logical clock value. The logical partition manager responds to the set clock instruction (SCK) by arithmetically combining the logical clock value with the host clock value to generate an epoch offset for the partition as the difference between the logical clock value and the host clock value.

In a preferred embodiment, the interface to the LP manager for logical partition activation includes two new fields: a logical ETR offset (absolute value) and a sign bit. The first is a time offset from the current ETR time. This value is applied to the ETR time (which normally reflects "universal time, coordinated" (UTC)—basically GMT time) as seen by the logical partition for which it is defined. Internally, the logical ETR offset may be carried as a single-word signed TOD clock value. The second parameter is an indication of the sign, positive or negative, of the specified logical ETR offset (if any).

At logical partition activation time, a partition that is using this new function will have these parameters passed to the LP manager and saved in the data block for the logical partition.

The ETR offset is used by the LP manager to modify the results of a Store ETR attachment information (STETR) instruction. The issuer of the STETR instruction (an OS image in a logical partition) will see an ETR time that does not match current STCK time when it initially loads. In the usual way of an initial program load it will then resynchronize (via a Set Clock (SCK) instruction) to its impression of the ETR time. This action will result in the LP manager calculating a difference which will be stored as that partition's epoch offset (an architected field in the logical CP's state descriptor), which will modify all STCK results. The end result will be a logical partition running with a STCK time equivalent to the real ETR time plus (or minus) the specified ETR offset.

The present invention gives computer users the capability to optionally specify a fixed time offset value for each logical partition, which will be applied to the logical partition's view of time from an attached external time reference. This capability allows for multiple sysplexes to be run from the same set of CPCs and ETRs at different local times. Alternatively or additionally, the CECs and the ETR(s) can be simultaneously used for both a current-date production sysplex and a year 2000 test sysplex.

The present invention enhances flexibility and reduces the cost for users needing to test or run multiple sysplexes with different time values—e.g., to service different time zones or customers (e.g. "service bureau" type users of sysplex) as well as customers wanting to test on the same hardware as used for production. The present invention allows one to set up each sysplex with a different time zone reflected in STCK.

DESCRIPTION OF THE PREFERRED EMBODIMENT

As a preliminary to describing the present invention, the conventional operation of a logically partitioned system synchronized to an external time reference will first be described.

Figure 1:
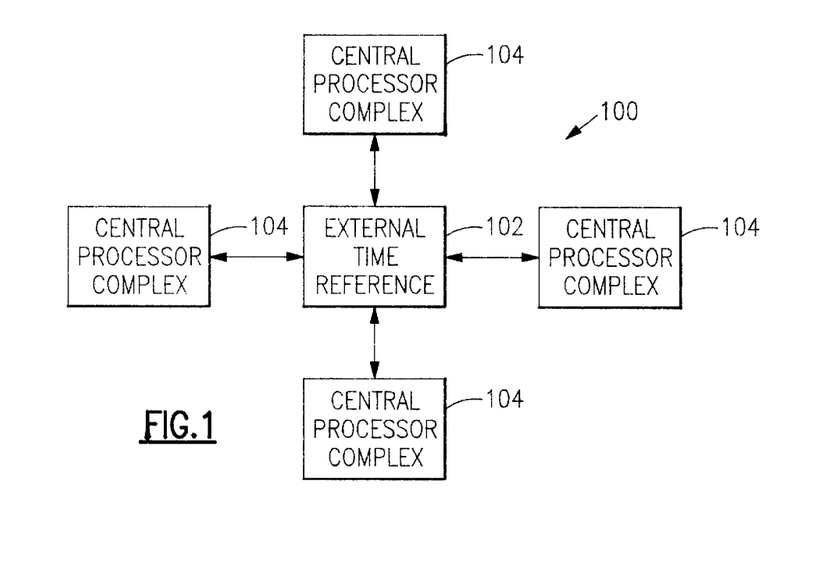
FIG. 1 is a schematic block diagram of a computer system complex incorporating the present invention.

Referring to FIG. 1, a multisystem complex 100 incorporating the present invention may comprise an external time reference (ETR) 102 to which one or more central processor complexes (CPCs) or host systems 104 are attached. ETR 102 provides a common time-of-day (TOD) clock value to which CPCs 104 are synchronized. In an exemplary implementation of the invention in an IBM S/390 environment, ETR 102 may comprise an IBM Sysplex Timer®, while each CPC may comprise an IBM S/390 processor such as a Parallel Enterprise Server™.

In such an S/390 implementation, the TOD value comprises a 64-bit unsigned integer (where bit 0 is the most significant bit and bit 63 is the least significant bit) in which bit position 51 is incremented every microsecond ($\mu$s). A clock value of zero corresponds to Jan. 1, 1900, 0 a.m. Coordinated Universal Time (UTC). The S/390 TOD format and associated instructions such as Set Clock (SCK) and Store Clock (STCK) are fully described in the IBM Publication *Enterprise Systems Architecture/390 Principles of Operation,* SA22-7201-02, December 1994, incorporated herein by reference.

Figure 2:
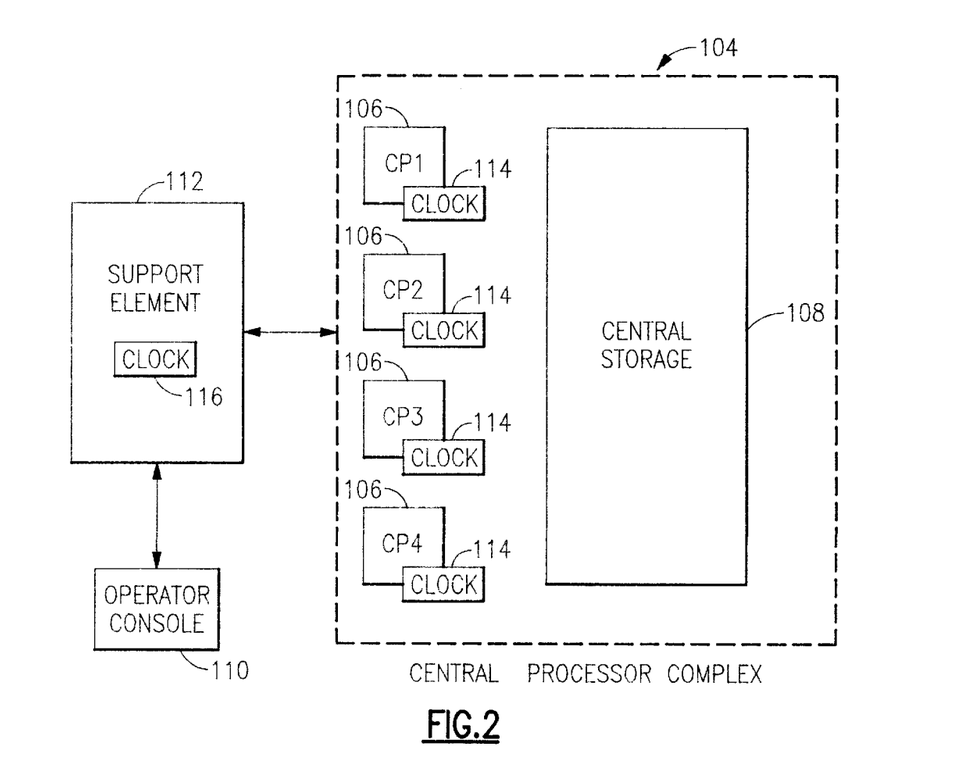
FIG. 2 is a schematic block diagram of a particular central processor complex of the system complex of FIG. 1, showing its principal hardware components.

Referring to FIG. 2, each central processor complex 104 contains one or more central processors (CPs) 106, an exemplary four of which (CP1–CP4) are shown, and central storage 108. Although not separately shown, central storage 108 may in turn comprise main storage accessible by programming and a hardware storage area (HSA) for storing microcode and the like.

Figure 9:
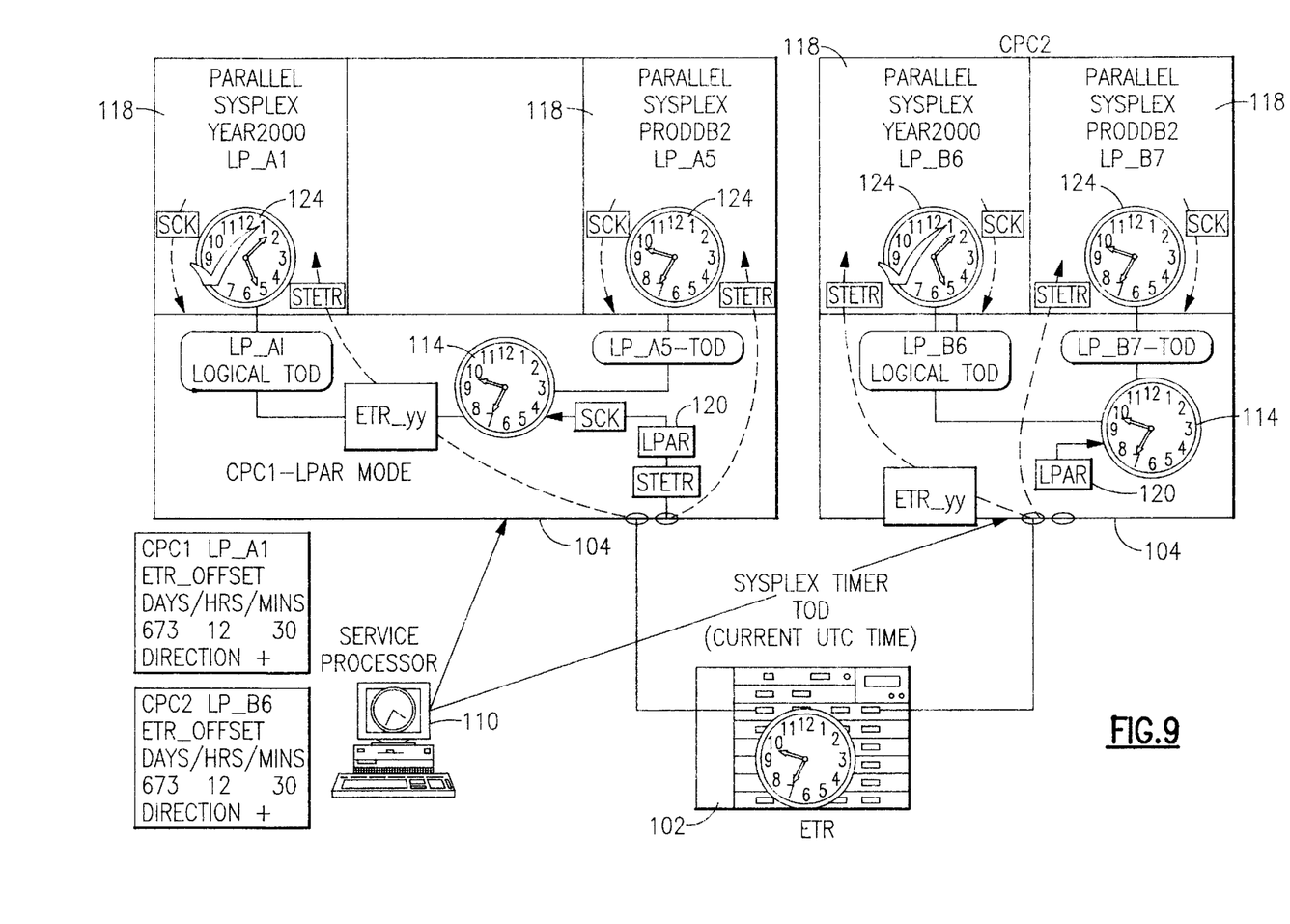
FIG. 9 shows two central processor complexes running two sysplexes set to different times.

A system console 110 is coupled to the central processor complex 104 via a support element (SE) 112. System console 110 may comprise either a non-programmable terminal or a programmable workstation (PWS) such as a personal computer. An exemplary such system console 110 is the IBM Hardware Management Console (HMC). System console 110 is the point from which the system operator enters commands and otherwise interacts with the central processor complex 104 to which the support element 112 is attached. As shown in FIG. 9, a single system console 110 may be used to control multiple central processor complexes 104. Although system console 110 and support element 112 are shown as separate elements, they may be physically and/or logically integrated if desired.

Each central processor 106 has its own TOD clock 114, while support element 112 has a TOD clock 116. TOD clocks 114, which may collectively be regarded as a "host clock", are automatically set during activation of CPC 104. The time reference used depends on whether or not an external time reference 102 is attached to the CPC 104. If an external time reference 102 is attached, the TOD clocks 114 are set to the TOD value of the external time reference. Otherwise, the TOD clocks 114 for each processor are set to the TOD value 116 of the support element 112.

As is conventional, central processor complex 104 is connected to user-accessible storage, comprising one or more direct access storage devices (DASD) such as magnetic disk drives, for permanent storage of the programs residing in the logical partitions to be described, as well as to other peripheral input/output (I/O) devices (not shown).

Figure 3:
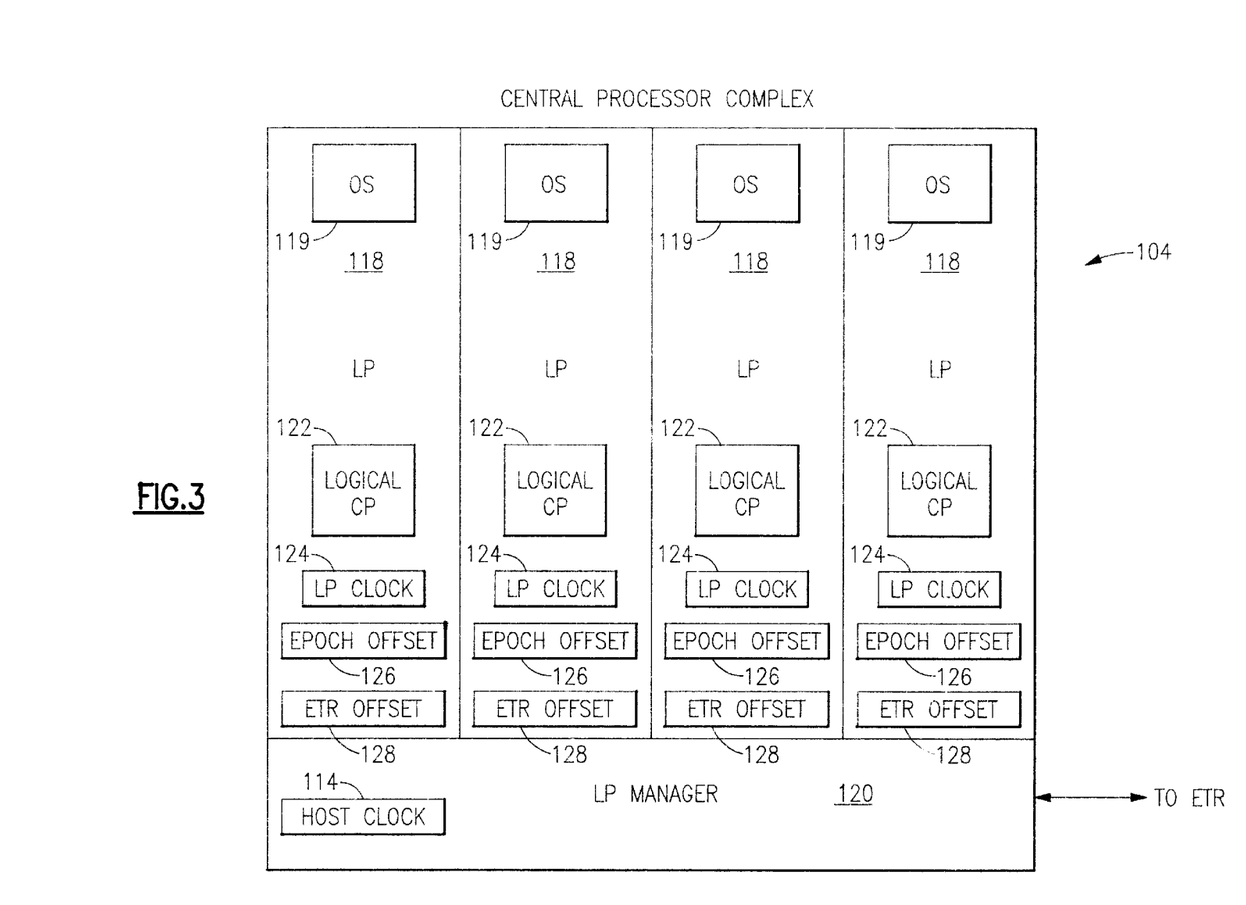
FIG. 3 is a schematic block diagram of the central processor complex of FIG. 2, showing its division into logical partitions.

Referring to FIG. 3, central processor complex 104 is divided into a plurality of logical partitions (LPs) 118, an exemplary four of which (LP1–LP4) are shown, which are managed by a logical partition manager 120 (LPAR). Logical partition manager 120 and logical partitions 118 each comprise one or more programs residing in respective portions of central storage 108. As noted above, from the standpoint of the resident programs, each logical partition 118 effectively functions as a separate hardware machine. Each logical partition 118 has its own operating system (OS) 119, which may differ for each logical partition. Although the invention is not so limited, in what follows it will be assumed that the operating system 119 in each logical partition 118 is the IBM OS/390® operating system. Logical partitioning in an S/390 environment is discussed further in the references cited above.

Each logical partition 118 has one or more logical processors (logical CPs) 122, each of which represents all or a share of a physical processor 106 allocated to that logical partition. Associated with each logical processor 122 is a logical TOD clock 124. The logical TOD clocks 124 for the logical processors 122 of a particular logical partition 118 agree with one another, but may differ from the clocks 124 of other partitions or from the host clock 114. Collectively, the logical TOD clocks 124 of a particular logical partition 118 may be regarded as the "logical partition clock" or "logical clock" for that partition.

Each logical partition 118 also has an epoch offset field 126 for storing the difference (epoch offset) between the logical partition clock 124 and the host clock 114. The epoch offset 126 is used as the basis for deriving the value of logical partition clock from that of the host clock 114 whenever the former is required, e.g. to execute a Store Clock instruction issued by the partition. Logical partition clock 124 is thus a derived clock obtained by arithmetically combining the host clock 114 and the epoch offset 126 whenever required to return a clock value to programming.

In the conventional operation of a logically partitioned S/390 CPC 104, as described, for example, in the IBM publication *Processor Resource/Systems Manager Planning Guide*, GA22-7236-03, June 1998, each logical partition 118 starts out with the value of the host clock 114 at the completion of logical partition activation. The operating system 119 running in a particular logical partition 118 can set a TOD value for itself, by issuing a Set Clock (SCK) instruction, and this will be the only TOD reference it will see. Setting the TOD clock 124 for one logical processor 122 in the logical partition 118 sets the TOD clock 124 for all logical processors in that logical partition, but does not affect the logical processors in any other logical partition. The value of the logical partition clock 124 is used for the duration of the logical partition activation, or until a subsequent Set Clock (SCK) instruction is issued in the logical partition 118.

The operating system 119 in each logical partition 118 can independently choose whether or not to synchronize to the external time reference 102 if one is present. Operating systems 119 in logical partitions 118 that do synchronize to the external time reference 102 will all be running with identical TOD values. Operating systems 119 in logical partitions 118 that do not synchronize to the external time reference 102 do not need to be aware of the presence of an external time reference 102 and can set their TOD values independently of all other logical partitions.

Operating systems 119 such as OS/390 can operate on an S/390 platform in either basic mode or in a logical partition 118 in LPAR mode. All instances of the OS/390 operating system require the S/390 hardware timing facilities: time-of-day (TOD) clock, CPU timer, and clock comparator. An OS image not part of a sysplex is not necessarily dependent on the TOD clock value being the same as in other OS images. OS images that participate in a sysplex are dependent on the TOD clock value and reference source being the same as in the other OS images that are part of the same sysplex.

When multiple CPCs 104 are used to run a sysplex, an external time reference (ETR) 102 is used to synchronize the TOD clocks 114 of the CPCs 104. When a CPC 104 operates in logically partitioned mode, the LP manager 120 on that machine 104 actually synchronizes the physical TOD clocks 114 of that CPC 104 to the attached ETR 102. Any logical partition 118 that is activated on that CPC 104 has its logical TOD clock 124, by default, initially synchronized to the ETR 102 as well.

Figure 4:
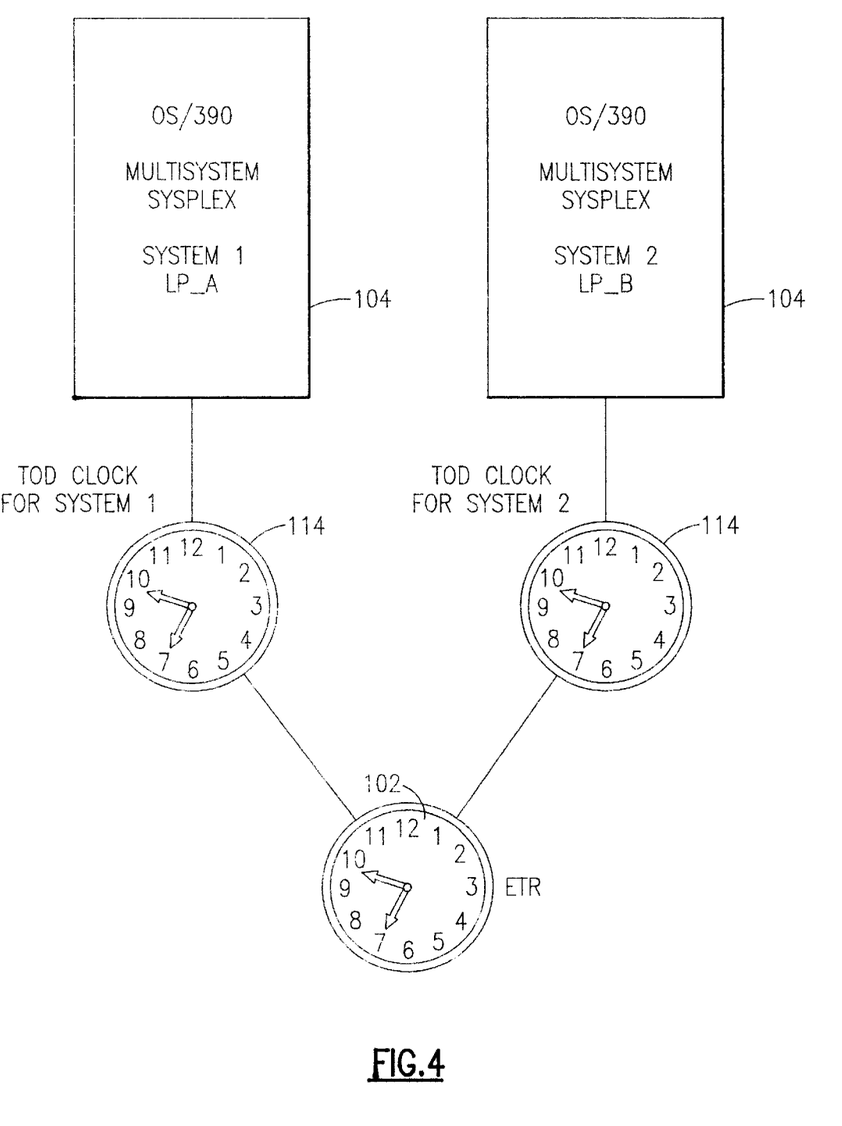
FIG. 4 shows a multisystem complex with two systems.

FIG. 4 shows a multisystem sysplex with two systems (where by "system" here is meant a CPC 104). System 1 has OS/390 in logical partition LP_A, and system 2 has OS/390 in logical partition LP_B. The physical TOD clocks 114 for each system 104 are shown to be in synch with the attached ETR 102. The LP manager 120 is not shown in this figure, but the logical TOD clocks 124 in the logical partitions 118 here are in synch with the physical TOD clocks 114 of their respective systems 104.

Each logical partition 118 on a CPC 104 can have its own view of the TOD clock. That is, each logical partition 118 can set its logical TOD clock 124 independently of all other logical partitions 118 on that machine 104. At the completion of activation for a logical partition 118, by default, the value of the logical TOD clock 124 for the partition 118 is equal to the value of the physical TOD clock 114 on the machine 104. The LP manager 120 establishes this and maintains changes to the partition's logical TOD clock 124 through an 8-byte epoch offset field 126 in the SIE state descriptors for the partition 118. Initially this field 126 is set to 0. If the logical partition 118 issues a Set Clock (SCK) instruction, the physical TOD clock 114 is not changed. Rather, the LP manager 120 calculates the difference between what the logical partition 118 wants to set as a clock value and the current TOD value in the physical clock 114. This difference is placed into the epoch offset field 126. All subsequent retrievals of TOD values for the logical partition (for example, issuing the Store Clock (STCK) instruction) will have the epoch offset value 126 added to the current physical TOD value 114 to form the resulting logical time-of-day (TOD) value 124 for the logical partition 118.

An ETR 102 provides synchronization for multiple CPCs 104. The synchronization is provided via a signal called an on-time-event (OTE). The OTE occurs whenever a carry out of bit 32 into bit 31 of the 64-bit TOD clock is to occur. Additionally, the ETR 102 provides a 4-byte value which maps to bits 0–31 of the current ETR time-of-day. An operating system 119 that wants to synchronize to an ETR 102 uses a Store ETR attachment information (STETR) instruction to retrieve information about the ETR 102. Included in the returned information is the 4-byte ETR time.

Figure 5:
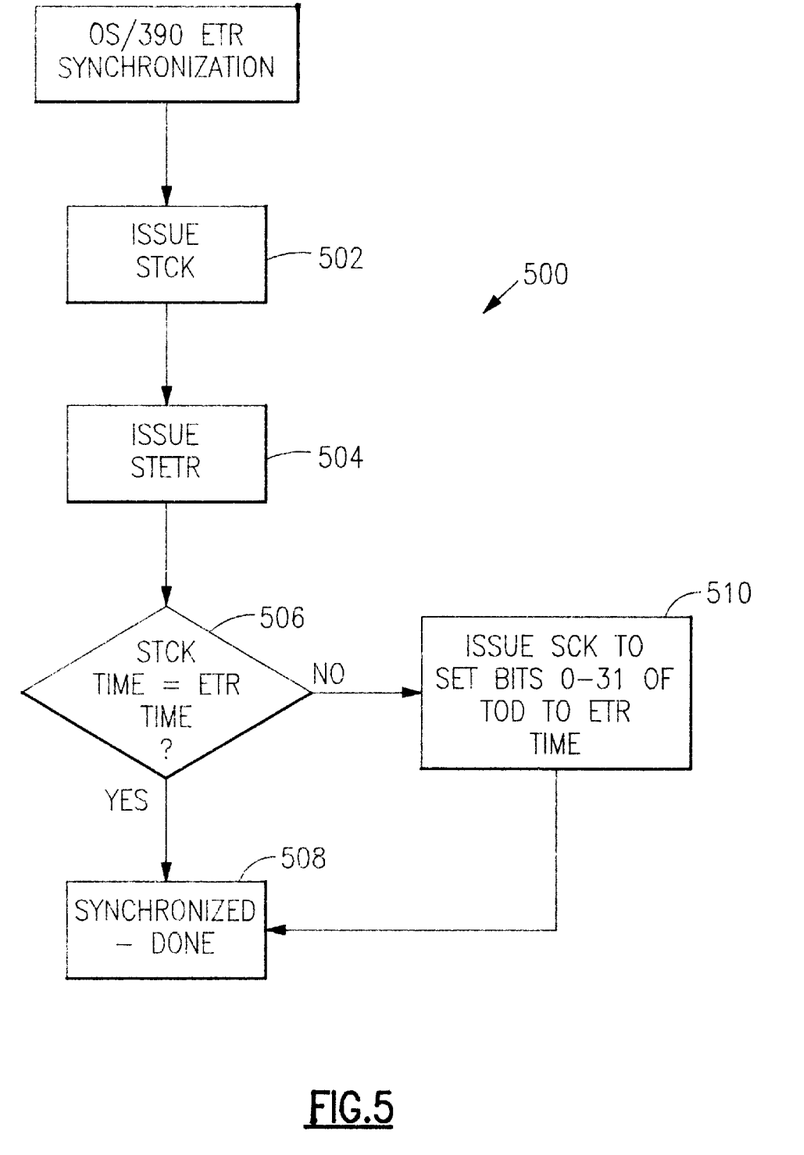
FIG. 5 shows the sequence used by an operating system to synchronize to an external time reference.

FIG. 5 shows the sequence 500 used by an operating system 119 (e.g., OS/390 ) in a particular partition to synchronize to an ETR 102. The operating system 119 issues both STCK to retrieve the current time-of-day for its system 104 (step 502) and STETR to retrieve the current time-of-day at the ETR 102 (step 504). If these times are equivalent (step 506), the partition 118 is already synchronized to the ETR 102 and there is nothing more to do (step 508). If not, the operating system 119 uses SCK to set its logical time-of-day (TOD) clock 124 to the time-of-day at the ETR 102 (step 510).

The above background information describes how an individual operating system 119, possibly running in a logical partition 118, synchronizes to an ETR 102 for the purpose of running in a multisystem sysplex. In the prior art, any and all systems 104 that are synchronizing to the same attached ETR 102 must run with the same (synchronized) time-of-day in their system clocks 114. This is because the ETR 102 only provides a single time reference to which any attached system 104 can synchronize. Multiple sysplexes are possible using multiple logical partitions 118 on the set of attached machines 104, but they all are running at the same time-of-day in their system clocks 114. It is desirable to run multiple sysplexes via logical partitions 118 on the same set of hardware where the sysplexes are synchronized to different time-of-days.

The present invention creates a logical partition ETR offset field 128 that is optionally specified for each logical partition 118. This offset is specified in days, hours, and quarter hours along with an indication of plus or minus. The offset is an offset from the time-of-day set at any attached ETR 102. The invention is preferably implemented as microcode for the support element 112, system console 110, and logical partition manager 120.

Figure 6:
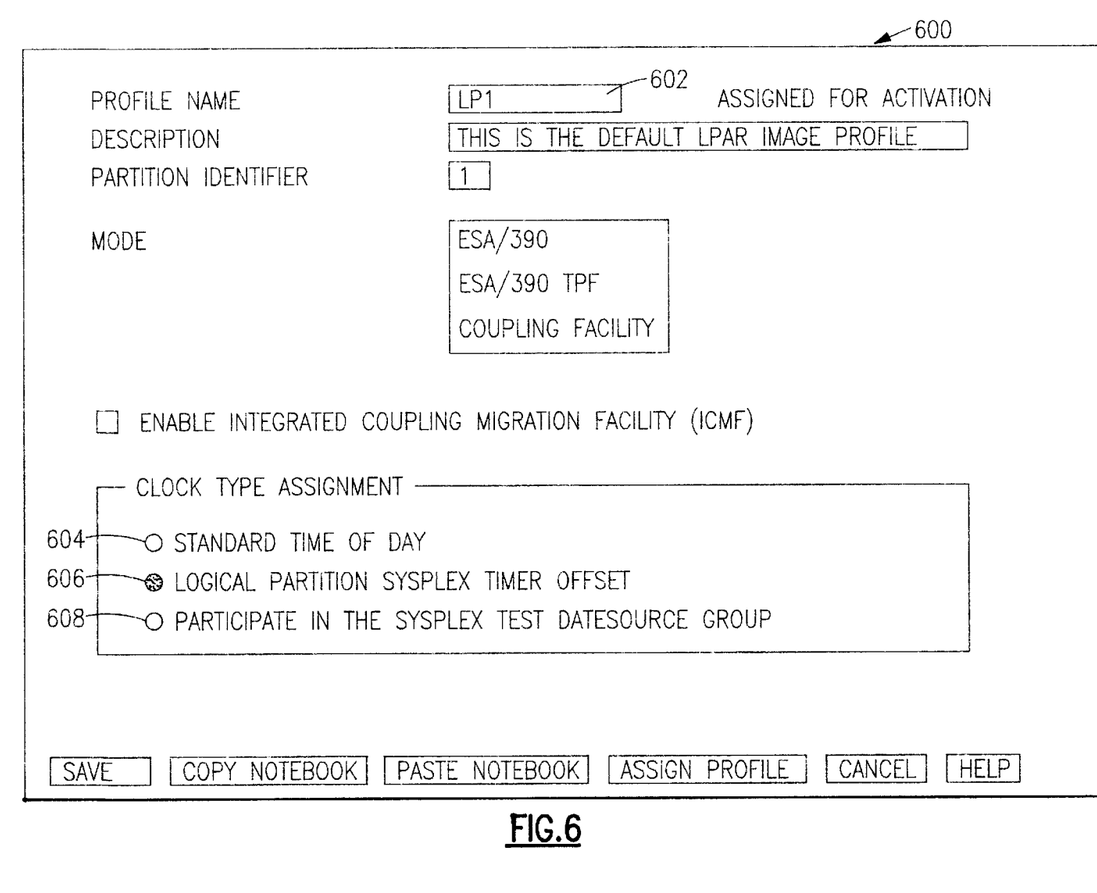
FIG. 6 shows a display panel that allows the optional selection of ETR offset for a logical partition.

FIG. 6 shows a panel 600 at the system console 110 that allows the optional selection of an ETR offset for a logical partition 118. As shown in the figure, panel 600 has a field 602 identifying the particular logical partition 118 to which it applies, as well as a set of alternatively actuable radio buttons 604, 606 and 608 specifying the clock type as being either standard time-of-day (i.e., no ETR offset), ETR ("Sysplex Timer") offset, or sysplex test datesource. If no ETR offset is specified, then the LP manager 120 returns the actual ETR clock value in response to a STETR instruction from the partition, as described below. If ETR offset is specified, then the LP manager 120 returns a logical ETR clock value offset from the actual ETR clock value by the ETR offset specified for the partition 118, as also described below. Finally, if sysplex test datesource is specified, then the partition 118 is synchronized to a test clock value independently of the ETR clock value, as specified in the above-identified U.S. Pat. No. 5,802,354. Suitable panel backing code precludes the simultaneous specification of both a logical ETR offset and a year 2000 sysplex test datesource for a given logical partition 118.

Figure 7:
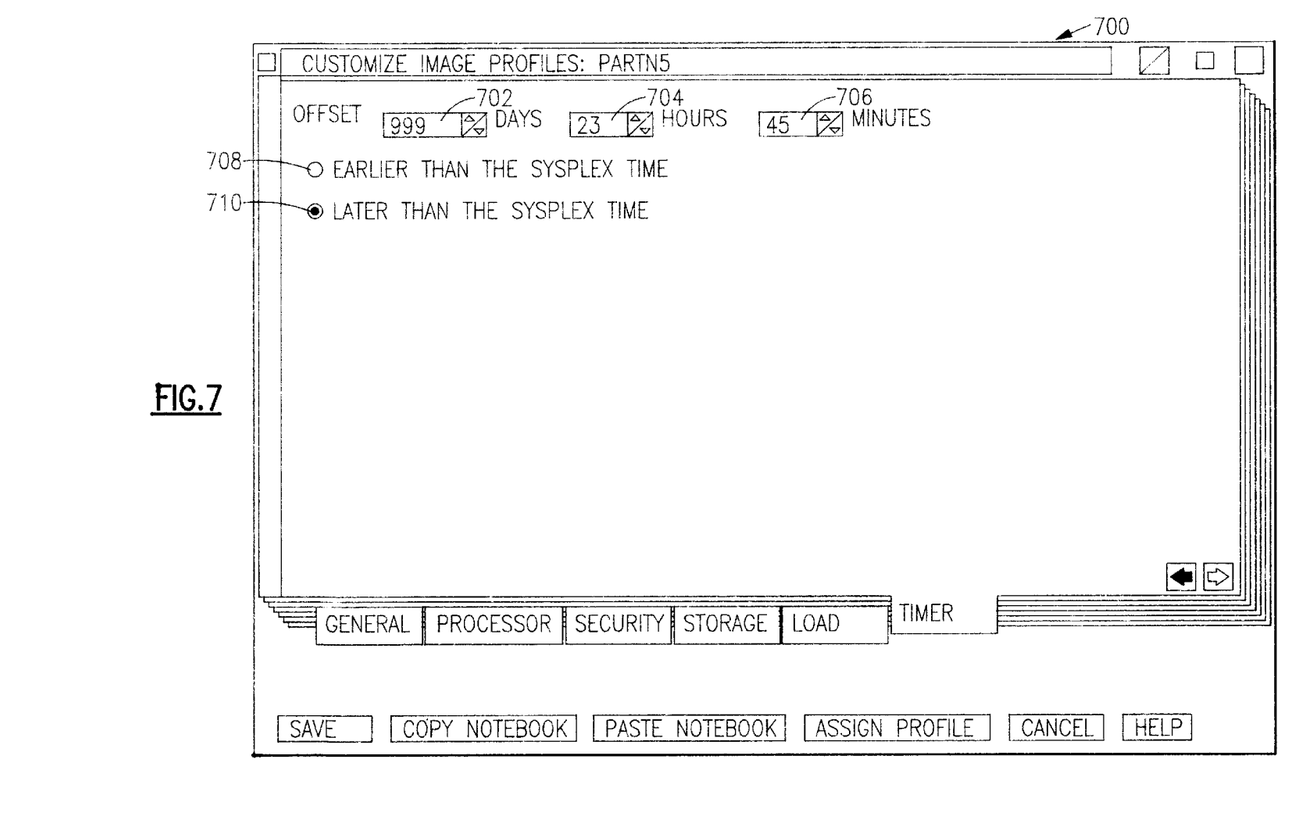
FIG. 7 shows a display panel for specifying an ETR offset for a logical partition.

FIG. 7 shows a panel 700 at the system console 110 to define what the ETR offset for the logical partition 118 should be. Panel 700 becomes active for a partition 118 if panel 600 is set to specify ETR offset for the partition. As shown in the figure, panel 700 has fields 702, 704 and 706 for entering an ETR offset in days, hours and minutes (with a 15-minute granularity in the minutes field 706), as well as alternatively actuable radio buttons 708 and 710 for indicating whether the ETR offset is negative (back in time) or positive (forward in time). The ETR offset is specified externally in days, hours, and quarter hours to satisfy both year 2000 testing and time zone requirements.

The ETR offset from the panel 700 is converted to a 4-byte TOD format value (bits 0–31 of an S/390 TOD) and is passed along with an indication of plus or minus, and an indication that the partition 118 wants to use an ETR offset in the logical partition activation block to the LP manager 120 when the logical partition 118 is activated. While the preferred embodiment uses a separate indication of plus or minus, this could easily be combined into one 4-byte parameter using, for instance, a 2's complement representation of the offset value to indicate a minus offset. The indication of whether or not that partition 118 wants to use an ETR offset could also be combined into the 4-byte field by using a value such as 0 to indicate that an ETR offset is not requested. The LP manager 120 saves this value for future use in the logical partition 118. By setting up a set of logical partitions 118 on multiple CPCs 104 with the same ETR offset values, those partitions 118 can operate in a sysplex with a common time reference that is still synchronized by the same ETR 102 but results in a sysplex time that is different from other logical partitions 118 on the same machines 104 that do not use an ETR offset. Note that multiple groupings (sysplexes) are possible with this invention. One grouping, the base group, uses the ETR time unchanged.

Recall the ETR synchronization sequence performed by each OS 119, shown in FIG. 5. When the STETR instruction is issued by the OS 119 (step 504), the LP manager 120 is invoked to simulate the instruction.

Figure 8:
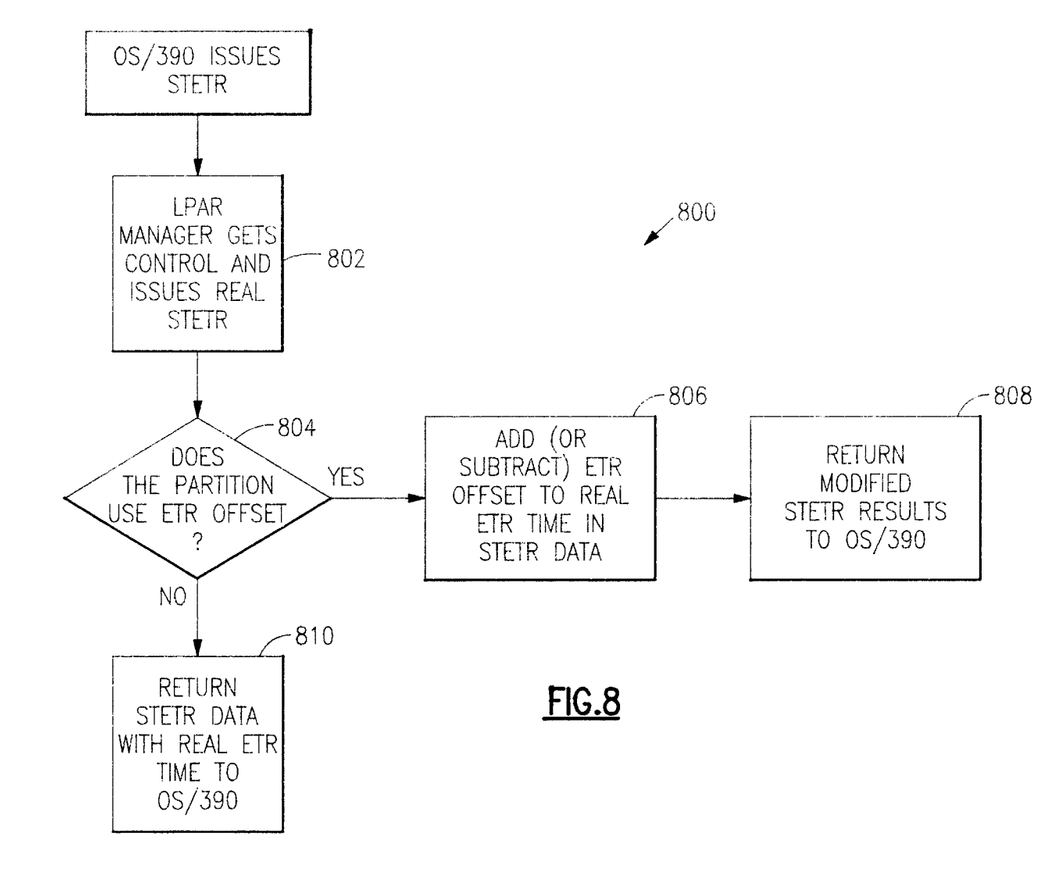
FIG. 8 shows the procedure for simulating a Store ETR (STETR) instruction in according with the present invention.

FIG. 8 shows the STETR simulation by the LP manager 120 for ETR offset. Referring to FIG. 8, upon receiving the STETR instruction from the logical partition 118 the LP manager 120 issues the real STETR instruction to the ETR 102 (step 802). If the logical partition 118 is defined to use an ETR offset (step 804), the LP manager 120 modifies the returned ETR time in the STETR results by the amount specified in the logical partition's ETR offset field 128 (step 806) and returns the modified results to the issuing logical partition 118 (step 808). Otherwise, the LP manager 120 returns STETR data with the real ETR time to the logical partition 118 (step 810).

Referring back to FIG. 5, assuming that the partition 118 is using ETR offset, the OS 119 will then see a difference between the ETR time obtained at step 504 and the system TOD obtained via STCK at step 502 (step 506). The OS 119 responds with a SCK instruction to set the time-of-day to the value at the ETR 102 that it sees (i.e. the modified STETR data) (step 510).

The LP manager 120 then simulates the SCK instruction by calculating an 8-byte epoch offset value from the actual physical TOD clocks 114, which are synchronized to the real ETR time. The results of future STCK instructions by the logical partition 118 are then modified by this epoch offset so that the partition 118 perceives time offset by the desired results, yet is still synchronized across multiple S/390 machines 104 via the real ETR OTE signaling.

FIG. 9 shows two machines 104 running two parallel sysplexes at different times. The PRODDB2 sysplex (partition LP_A5 in CPC1 and partition LP_B7 in CPC2) uses the current ETR time unmodified. The YEAR2000 sysplex (partition LP_A1 in CPC 1 and partition LP_B6 in CPC2) uses an ETR offset (plus 673 days, 12 hours, 30 minutes in this example) to establish a date and time for year 2000 testing.

The invention is preferably implemented as software or microcode (i.e., a machine-readable program of instructions tangibly embodied on a program storage devices) executing on one or more hardware machines. While a particular embodiment has been shown and described, various modifications will be apparent to those skilled in the art.

What is claimed is:

1. In an information handling system in which a single physical machine is divided into a plurality of logical partitions, each of which functions as a logical machine having access to specified resources of said physical machine, a method of synchronizing said logical partitions to an external time reference (ETR) clock value, comprising the steps of:

storing a host clock value and, for each of said logical partitions, an epoch offset from the host clock value;

specifying for each of a subset of said plurality of logical partitions an ETR offset from said ETR clock value;

in response to a request from a logical partition to read the host clock value, arithmetically combining the host clock value with the epoch offset stored for the partition to generate a logical clock value that is returned to the partition as a host clock value;

in response to a request from a logical partition from said subset to read the ETR clock value, arithmetically combining the ETR clock value with the ETR offset specified for the partition to generate an offset ETR clock value that is returned to the partition as an ETR clock value; and in response to a request from a logical partition to set the host clock value to a new clock value, storing a new epoch offset for said partition that is generated as the difference between the new clock value and the host clock value.

2. In an information handling system in which a single physical machine is divided into a plurality of logical partitions, each of which functions as a logical machine having access to specified resources of said physical machine, apparatus for synchronizing said logical partitions to an external time reference (ETR) clock value, comprising:

means for storing a host clock value and, for each of said logical partitions, an epoch offset from the host clock value;

means for specifying for each of a subset of said plurality of logical partitions an ETR offset from said ETR clock value;

means responsive to a request from a logical partition to read the host clock value for arithmetically combining the host clock value with the epoch offset stored for the partition to generate a logical clock value that is returned to the partition as a host clock value;

means responsive to a request from a logical partition from said subset to read the ETR clock value for arithmetically combining the ETR clock value with the ETR offset specified for the partition to generate an offset ETR clock value that is returned to the partition as an ETR clock value; and means responsive to a request from a logical partition to set the host clock value to a new clock value for storing a new epoch offset for said partition that is generated as the difference between the new clock value and the host clock value.

3. A program storage device readable by a machine, tangibly embodying a program of instructions executable by the machine to perform method steps for synchronizing logical partitions to an external time reference (ETR) clock value in an information handling system in which a single physical machine is divided into a plurality of logical partitions, each of which functions as a logical machine having access to specified resources of said physical machine, said method steps comprising:

storing a host clock value and, for each of said logical partitions, an epoch offset from the host clock value;

specifying for each of a subset of said plurality of logical partitions an ETR offset from said ETR clock value;

in response to a request from a logical partition to read the host clock value, arithmetically combining the host clock value with the epoch offset stored for the partition to generate a logical clock value that is returned to the partition as a host clock value;

in response to a request from a logical partition from said subset to read the ETR clock value, arithmetically combining the ETR clock value with the ETR offset specified for the partition to generate an offset ETR clock value that is returned to the partition as an ETR clock value; and in response to a request from a logical partition to set the host clock value to a new clock value, storing a new epoch offset for said partition that is generated as the difference between the new clock value and the host clock value.

* * * * *